(12) United States Patent  
Garcia

(10) Patent No.: US 10,533,234 B2  
(45) Date of Patent: Jan. 14, 2020

(54) METHOD FOR LASER BEAM HEAT TREATMENT OF PRESS HARDENED COMPONENTS AND PRESS HARDENED COMPONENTS

(71) Applicant: AUTOTECH ENGINEERING A.I.E., Amorebieta-Etxano (ES)

(72) Inventor: Michel Garcia, Sitges (ES)

(73) Assignee: AUTOTECH ENGINEERING S.L., Amorebieta-Etxano (ES)

(*) Notice: Subject to any disclaimer, the term of this patent is extended or adjusted under 35 U.S.C. 154(b) by 303 days.

(21) Appl. No.: 15/511,224

(22) PCT Filed: Sep. 22, 2015

(86) PCT No.: PCT/EP2015/071783  
§ 371 (c)(1),  
(2) Date: Mar. 14, 2017

(87) PCT Pub. No.: WO2016/046231  
PCT Pub. Date: Mar. 31, 2016

(65) Prior Publication Data  
US 2017/0283892 A1     Oct. 5, 2017

(30) Foreign Application Priority Data

Sep. 22, 2014   (EP) .................................. 14382354

(51) Int. Cl.  
*C21D 1/26* (2006.01)  
*B21D 22/02* (2006.01)  
(Continued)

(52) U.S. Cl.  
CPC ............. *C21D 1/26* (2013.01); *B21D 22/022* (2013.01); *B21D 47/01* (2013.01); *B23K 26/034* (2013.01);  
(Continued)

(58) Field of Classification Search  
None  
See application file for complete search history.

(56) References Cited

U.S. PATENT DOCUMENTS 3,703,093 A   11/1972   Komatsu et al.  
5,431,445 A   7/1995   Wheatley  
(Continued)

FOREIGN PATENT DOCUMENTS

DE   19743802 A1   3/1999  
DE   10236161 C1   9/2003  
(Continued)

OTHER PUBLICATIONS

International Search Report and Written Opinion dated Jan. 14, 2016 for PCT/EP2015/071783, 11 pages.  
(Continued)

*Primary Examiner* — Guinever S Gregorio  
(74) *Attorney, Agent, or Firm* — Squire Patton Boggs (US) LLP

(57) ABSTRACT

Methods for manufacturing hot-stamped components are described. The method includes providing a hot-stamped component by hot forming die quenching, and selecting a first and a second portion of the hot-stamped component, wherein the first portion has a different width than the second portion. A laser system, wherein the laser system includes one or more optical elements and a laser source for generating a laser beam. The laser system is moved along a length of the component. Finally, the laser beam is applied in a single pass onto the selected first and second portions using the laser system, wherein a laser beam spot size is adjusted during the application of the laser beam and is adapted to the widths of the first and second portions, and wherein a power of the laser beam is regulated based on the temperature measured in the hot-stamped component. The (Continued)

disclosure further relates to components obtained using such methods.

20 Claims, 4 Drawing Sheets

(51) Int. Cl.
  *B21D 47/01*   (2006.01)
  *B23K 26/03*   (2006.01)
  *B23K 26/073*   (2006.01)
  *B62D 25/04*   (2006.01)
  *C21D 1/34*   (2006.01)
  *C21D 8/00*   (2006.01)
  *C21D 1/673*   (2006.01)

(52) U.S. Cl.
  CPC ........ *B23K 26/073* (2013.01); *B23K 26/0732* (2013.01); *B62D 25/04* (2013.01); *C21D 1/34* (2013.01); *C21D 8/005* (2013.01); *C21D 1/673* (2013.01); *C21D 2221/00* (2013.01)

(56) References Cited

U.S. PATENT DOCUMENTS

| | | | |
|---|---|---|---|
| 6,820,924 | B2 | 11/2004 | Caliskan et al. |
| 2004/0018049 | A1 | 1/2004 | Yang |
| 2004/0201256 | A1 | 10/2004 | Caliskan et al. |
| 2012/0267919 | A1 | 10/2012 | Yoshida et al. |
| 2013/0292009 | A1* | 11/2013 | Hayashi ............... C21D 8/0226 148/518 |

FOREIGN PATENT DOCUMENTS

| | | | | |
|---|---|---|---|---|
| EP | | 2209696 A1 | 7/2010 | |
| EP | | 2541093 A1 | 1/2013 | |
| EP | | 2561946 A1 * | 2/2013 | ........... B23K 11/115 |
| EP | | 2561946 A1 | 2/2013 | |
| EP | | 2565489 A1 | 3/2013 | |
| FR | | 2294900 A1 | 7/1976 | |
| GB | | 2313848 A | 12/1997 | |
| JP | | H07119892 A | 5/1995 | |
| JP | | 2003/112260 A | 4/2003 | |
| JP | | 2005/178710 A | 7/2005 | |
| JP | | 2011/173166 A | 9/2011 | |
| WO | WO 2006/038868 A1 | | 4/2006 | |
| WO | WO 2009/064236 A1 | | 5/2009 | |
| WO | WO 2010/126423 A1 | | 11/2010 | |
| WO | WO 2011/108080 A1 | | 9/2011 | |
| WO | WO 2012/156084 A1 | | 11/2012 | |
| WO | WO 2014/087219 A1 | | 6/2014 | |

OTHER PUBLICATIONS

Baumann, et al: "Local heat treatment of high strength steels with zoom-optics and 10kW-diode laser", High Power Laser Materials Processing: Lasers, Beam Deliver, Diagnostics, and Applications, SPIE, vol. 8239, No. 1, 2012, pp. 1-9.

* cited by examiner 21
22
23
24

26
27

METHOD FOR LASER BEAM HEAT TREATMENT OF PRESS HARDENED COMPONENTS AND PRESS HARDENED COMPONENTS

This application claims the benefit of European Patent Application EP14382354.0 filed on Sep. 22, 2014.

The present disclosure relates to methods for manufacturing hot-stamped components and to components obtained through these methods.

BACKGROUND

In the field of vehicle construction, the development and implementation of lightweight materials is becoming more and more important in order to satisfy criteria for lightweight construction. The growing concern for occupant safety also leads to the adoption of materials which improve the integrity of the vehicle during a crash while also improving the energy absorption.

A process known as Hot Forming Die Quenching (HFDQ) (also known as hot stamping or press hardening) uses boron steel sheets to create stamped components with Ultra High Strength Steel (UHSS) properties, with tensile strengths up to 1,500 MPa. The increase in strength as compared to other material allows for a thinner gauge material to be used, which results in weight savings over conventionally cold stamped mild steel components.

Typical vehicle components that can be manufactured using the HFDQ process include: door beams, bumper beams, cross/side members, A/B pillar reinforcements, and waist rail reinforcements.

In order to improve the ductility and energy absorption in key areas it is known to introduce softer zones within the same component. This improves ductility locally while maintaining the required high strength overall. By locally tailoring the microstructure and mechanical properties of certain structural components such that they comprise regions with very high strength (very hard) and regions with increased ductility (softer), it may be possible to improve their overall energy absorption and maintain their structural integrity during a crash situation and also reduce their overall weight. Such soft zones may also advantageously change the kinematic behavior in case of collapse of a component under an impact.

The soft zones can be manufactured taking into account the kinematics of the impact and the form of the component. Due to this fact, the shapes of the soft zones are becoming more and more complex.

A known solution may be the document WO2012156084, it discloses forming locally defined soft areas of the sheet metal component by means of locally tempering predetermined sub-areas of the sheet metal component by means of a laser beam method, according to which the predetermined sub-areas are exposed to a laser beam.

A drawback of this solution may be that in some particular complex forms e.g. a corner or a step may be difficult to apply a laser beam without downtimes related to the need of changing parts of the laser. Furthermore, several consecutive exposures of the component to the laser beam may be required, thus the time for defining the soft area may be increased.

EP2561946 is related to a method for the manufacture of a part of a structural component of a vehicle, intended to be connected by spot welding to a second part, starting from a coated steel plate and of a thickness of 1-3 mm, which comprises subjecting the plate to hot stamping, subsequently subjecting at least one localized and previously selected zone of the first part to a heat treatment, irradiating it with a diode laser beam of a power comprised between 500 W and 6 kW until reaching a temperature comprised between 400-900 DEG C., then leaving it to cool to change its microstructure, providing said zone with an intentionally lower martensite content and accordingly with a lower strength and greater elongation in comparison with those of its adjacent zones that have not been heat treated.

Baumann Markus et al, "Local Heat Treatment of high strength steel with zoom-optics and 10 kW-diode laser", vol. 8239, no. 1, 2012, pages 1-9 describes a fiber-coupled 10 kW laser-source based on diode laser technology and a homogenizing zoom optical system creating rectangular sports of variable dimensions with homogeneous power density.

It is an object of the present disclosure to provide improved methods of manufacturing hot-stamped components.

SUMMARY

In a first aspect, a method for manufacturing hot-stamped components is provided. The method comprises the steps of: providing a hot-stamped component by hot forming die quenching. The method further includes selecting a first and a second portion of the hot-stamped component for which a microstructure is to be changed, wherein the first portion has a different width than the second portion. A laser system is provided, wherein the laser system comprises one or more optical elements and a laser source for generating a laser beam. Then, the laser system may be moved along a length of the component, while applying a laser beam in a single pass onto the selected first and second portions to change their microstructure of the hot-stamped component using the laser system. A laser beam spot size is adjusted during the application of the laser beam and is adapted to the widths of the first and second portions, and wherein a power of the laser beam is regulated based on the temperature measured in the determined portions of the hot-stamped component. The first portion is a soft zone for absorbing energy in a crash, and the second portion is a portion used in a post-operation.

It has been found that an adjustable laser beam spot during the application of the laser beam may be an advantage. In this respect, various sizes of laser beam spots and ratios may be provided and therefore, the formation of very specific and precise geometries having a wide variety of shapes may be achieved. In consequence, the need for time-consuming changes of processing heads and the associated realignment may be avoided, thus the manufacturing time as well as the need of several exposures to the laser beam may be reduced. Furthermore, in soft zones with complex shapes the same laser may be applied, thus the standardization of the manufacturing process may be improved. In addition, the transition zone situated between regions with very high strength (very hard) and regions with increased ductility (softer) may be reduced due to the fact that only one exposure to the adjustable laser beam spot may be needed. In this way, the accuracy determining the soft zones may be improved. When dealing with HFDQ processes and ultra-high strength materials, post-operations may require changing the local microstructure. Increased ductility is needed in order to be able to bend flanges, attach parts by riveting etc.

Additionally, the power of the laser beam may be regulated based on the temperature, thus a consistent heat treatment can be obtained.

The laser technology as described herein allows for these sorts of post-operations to be combined with the formation of a soft zone. The dies used in a hot stamping process may thus be simplified since no separate temperature zones need to be provided.

Preferably, the first and second (and possible other) portions for which the microstructure is to be changed are heated by the laser in a single pass along the length of the component.

In a further aspect the present disclosure provides components as obtained by or obtainable by any of the methods substantially as hereinbefore described.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1A:
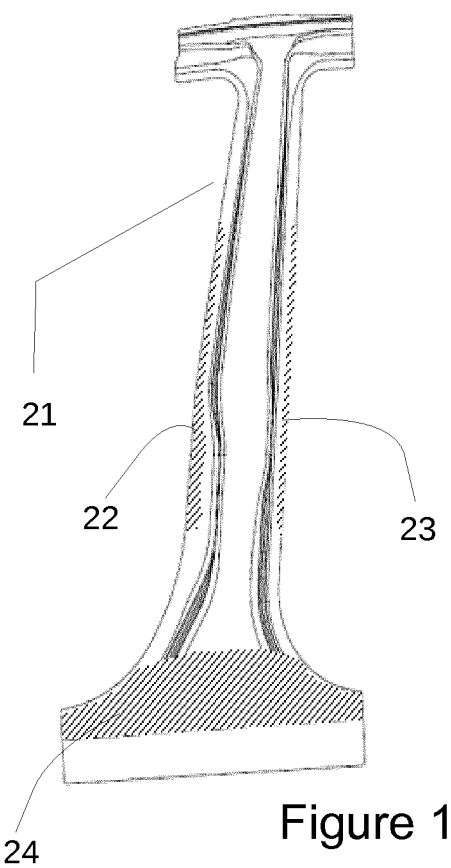
FIGS. 1a-1b show examples of a component with soft zones manufactured by any method substantially as hereinbefore described.

FIGS. 1a-1d show examples of a component with soft zones manufactured by a method substantially as hereinbefore described. In the example of FIG. 1a a B-pillar 21 is schematically illustrated. In the same way, in the example of FIG. 1b a B-pillar 26 is schematically illustrated. Both components 21 and 26 may be formed e.g. by HFDQ process. In some examples, the components 21 and 26 may be made of steel.

In FIG. 1a, the soft zone 24 may be selected to change the microstructure e.g. increasing ductility. The selection of the soft zone may be based on crash testing or simulation test although some other methods to select the soft zones may be possible. The soft zone areas may be defined by simulation in order to determine the most advantageous crash behavior or better energy absorption in a part such as e.g. a B-pillar. A laser beam (not shown) may be applied onto the selected soft zone 24 using the laser system. The laser spot size may be adjusted during the application of the laser beam and it may be adapted to the height and/or width of the soft zone 24, thus the time-consuming change of the optic of the laser system after each application of the laser may be avoided. In the same way, a second soft zone may be selected 23 as commented above, the laser beam (not shown) may be moved to the second soft zone 23 and it may be applied onto the selected portion 23 using the laser system. The laser spot size may be adjusted during the application of the laser beam to the shape of the second soft zone 23. Similarly as before, the laser beam (not shown) may be moved to a third soft zone 22 and it may be applied onto the selected third soft zone 22. In the same way, the laser spot size may be adjusted during the application of the laser beam to the shape of the third soft zone 22. The operation of the laser may be similar as described above to the soft zone 24.

In this way, the soft zones 24, 23, 22 may have enhanced ductility, while the strength of the parts next to the soft zone may be maintained. The microstructure of the soft zones 24, 23, 22 may be modified e.g. the tensile strength of the soft zones 24, 23, 22 may be less than 600 MP and the elongation in the soft zones 24, 23, 22 may be increased up to 20%. The soft zones 22, 23, 24 may be obtained with only one optic of the laser system (not shown), while adjusting the laser spot size. In consequence, the investment in tools may be reduced as well as the maintenance cost. The manufacturing time may be reduced as well. Furthermore, the variation of the spot may reduce the transition zones at the starting and the final points of the soft zones 24, 23, 22.

The laser beam may be regulated based on some parameters e.g. temperature measured in the soft zones determined of the component 8 using a thermometer, e.g. a pyrometer or a camera, to measure high temperatures, thus maintaining the temperature of the laser beam spot. The soft zones 24, 23, 22 may be made having different shapes and having different applications e.g. flanges, small or large spots, complex geometric shapes. Using examples of the methods and laser applications as herein described, in a single pass, or in very few "laser passes", local microstructures may be changed e.g. around riveting areas, around flanges, for larger soft zones etc. These sorts of post-operations can be combined with the formation of a soft zone in a single pass, reducing manufacturing time. The dies used in a hot stamping process may furthermore be simplified since no separate temperature zones need to be provided.

Figure 1B:
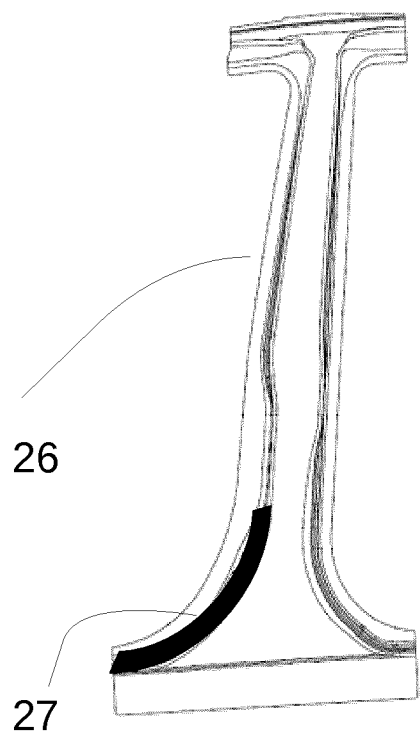

The example of the FIG. 1b shows a top-view of an example of a B-pillar 26 in which a soft zone 27 with a particular shape has been carried out. The selection of the soft zone, the structure of the B-pillar and the operation may be similar as described in the FIG. 1a.

Figure 2A:
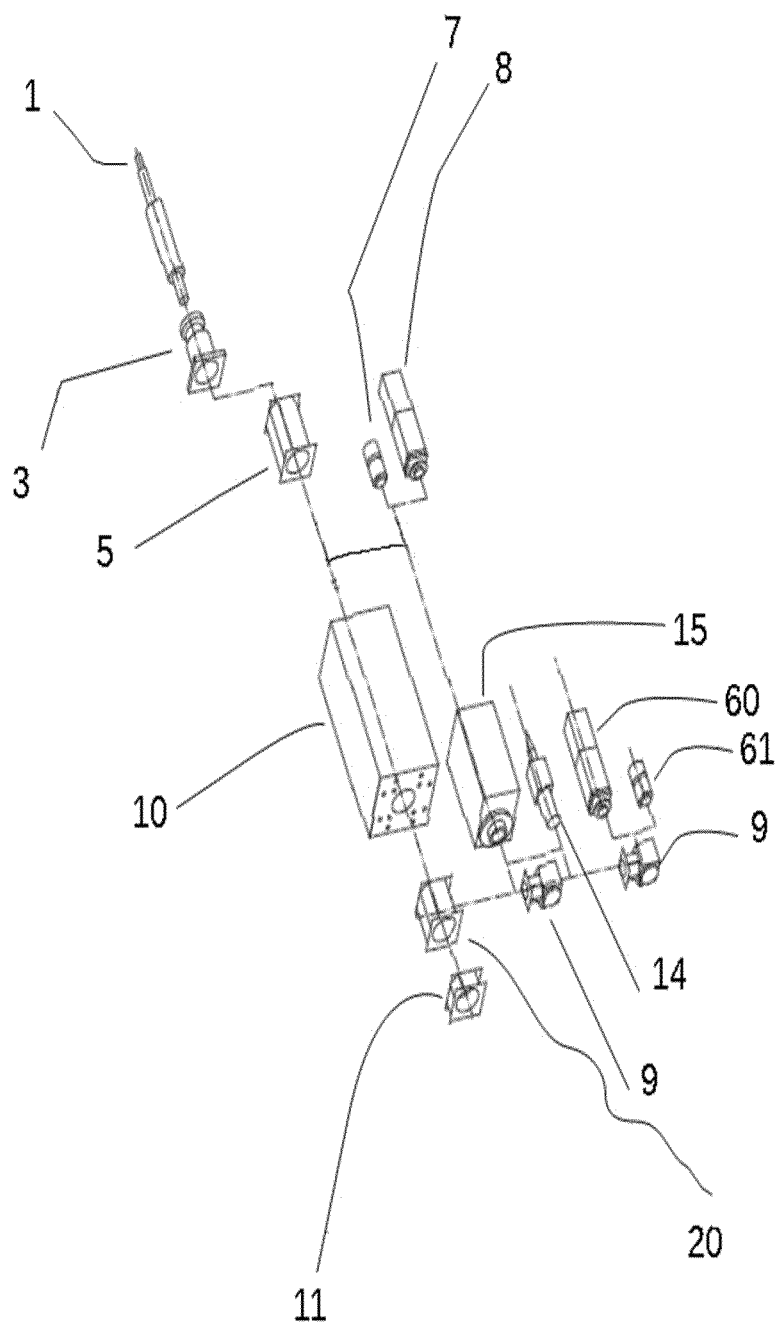
FIGS. 2a and 2b show each and example of a laser system.

FIG. 2a shows schematically an example of a laser system, the laser system may have a fiber connector 3. The fiber connector 3 may be connected at one distal end to an optical fiber 1.

The fiber connector 3 may enable a quick and reliable connection and disconnection to the optical fiber 1. The optical fiber 1 may act as a guide for the beam of particles and waves.

A collimating unit 5 may be provided. The collimating unit 5 may cause the directions of motion of the laser beam to become more aligned in a specific direction.

The laser system may have a single color pyrometer 8 although some other alternatives may be possible e.g. two color pyrometer 7. The single color pyrometer 8 may determine the temperature by measuring the radiation emitted from a surface at one wavelength. In this way, the power of the laser beam may be regulated taking into account the temperature.

A zoom homogenizer 10 is also schematically shown. The zoom homogenizer may adapt the shape of the laser spot as described later on.

In alternative examples, the zoom homogenizer 10 may be configured to be connected at the second end to a coupling unit 20. The coupling unit 20 may be attached to a focusing element 11. The coupling element 20 may be configured to be provided with an adaptor 9. The adaptor 9 may attached to a camera 15 e.g. EMAQS camera. The EMAQS camera is a camera-based temperature data acquisition system although some other alternatives are possible e.g. CCD camera 14.

In some other alternative examples, the zoom homogenizer 10 may be configured to be connected to a single color pyrometer 60 although some other alternatives may be possible e.g. two color pyrometer 61. The single color pyrometer 60 may determine the temperature by measuring the radiation emitted from a surface at one wavelength. In this way, the power of the laser beam may be regulated taking into account the temperature.

The laser system may be mounted on a robot (not shown). The robot may be mounted on the floor but some other configurations may be possible, e.g. roof mounted. The robot may be controlled by control means (not shown). An example of a robot that may be that may be employed is the robot IRB 6660 or IRB 760, available from ABB, among others.

The laser power of the laser system may be limited 20000 W.

Figure 2B:
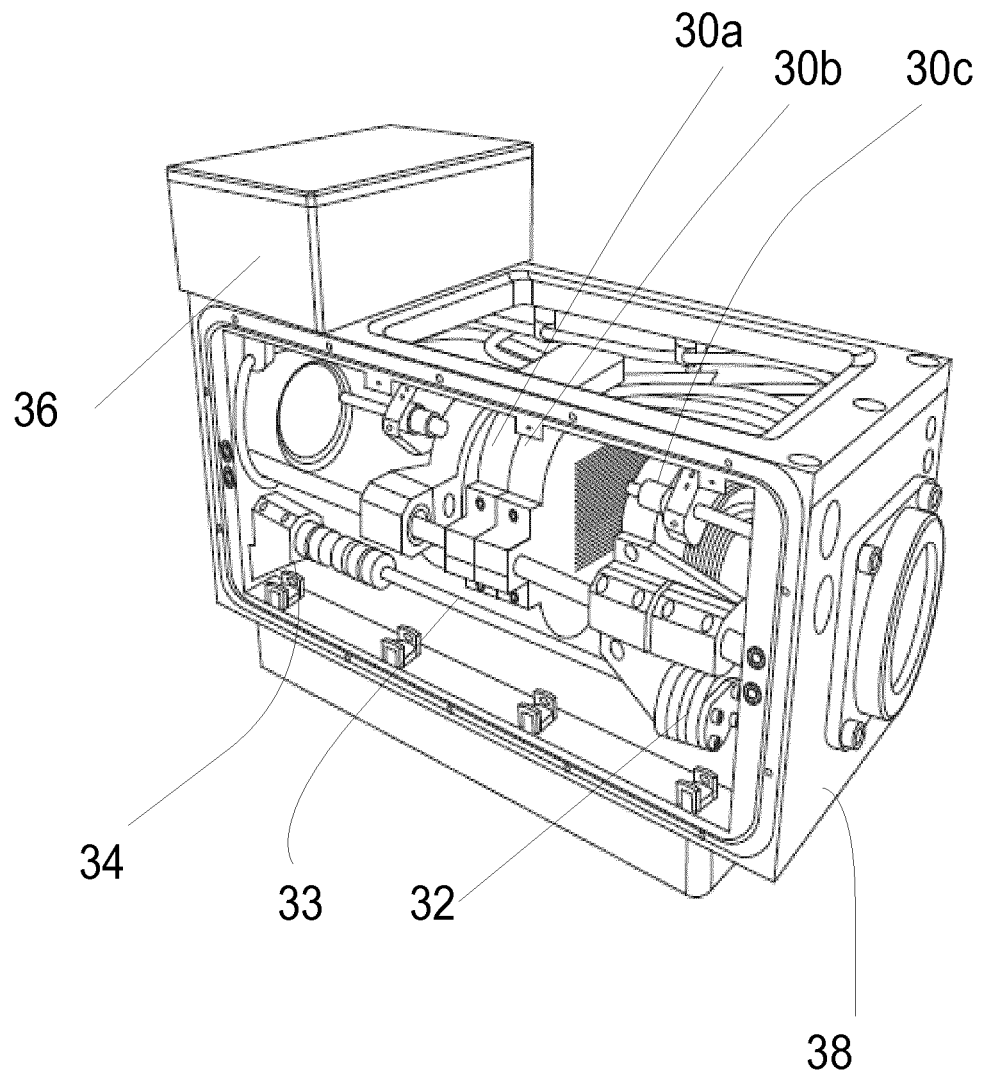

FIG. 2b shows schematically the zoom homogenizer 10. The zoom homogenizer 10 may transform the beam into a shape e.g. rectangular, circular. The zoom homogenizer 10 may be part of the laser system shown in the FIG. 2a. The zoom homogenizer 10 may comprise a housing 38 at least partially enclosing the laser system.

The housing 38 may comprise a lens array 30a, 30b and 30c. The lens array 30a, 30b and 30c may adjust a spot of the laser beam to the width or length of the different portions of the element scanned during the application of the laser. The lens array may implement various focus lines or areas with edges lengths or width up to 180 mm. The top-hat energy distribution in the laser focus may be homogenous across the entire setting range, thus the uniform energy input across the entire setting range may be ensured. The lens array 30a, 30b and 30c may be designed for laser power outputs up to 20000 W.

A gear motor 34 may adjust the size of the laser beam spot acting on the lens array 30a, 30b and 30c. The laser beam spot may be motor-adjustable on both axes. A plurality of focus sizes and ratios may be implemented using the lens array 30a, 30b and 30c. The motorized movement of the lens array 30a, 30b and 30c using the gear motor 34 may enable the laser beam width or height to be dynamically adjusted. The actuation of the gear motor 34 may enable integration into any machine control system.

The 34 gear motor may be attached to a threaded spindle 33. The threaded spindle 33 may transmit the motion generated by the gear motor 34. The threaded spindle 33 may have attached at one distal end a spindle nut 32. A motion control unit 36 may be provided controlling the motion of some of the elements of the zoom homogenizer 10 e.g. the gear motor 34. The position or velocity of the gear motor 34 may be controlled using some type of device such as a servo although some other options are possible e.g. a hydraulic pump, linear actuator, or electric motor.

Figure 3A:
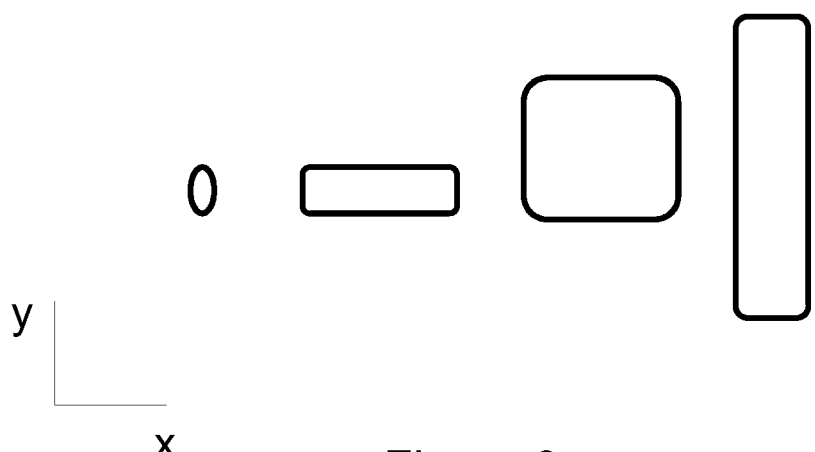
FIGS. 3a and 3b show examples of different specific shapes of the laser beam spot.
Figure 3B:
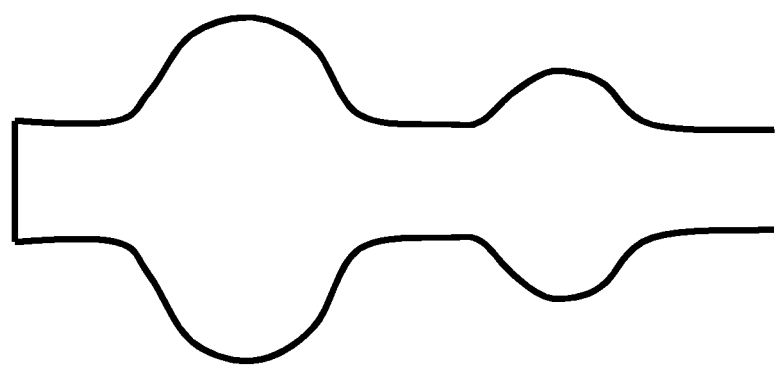

The FIGS. 3a and 3b show examples of different specific shapes of the laser beam spot. As mentioned before, various sizes of laser beam spots and ratios may be provided and therefore, the formation of very specific and precise geometries having a wide variety of shapes may be achieved. In consequence, almost any desired geometry having e.g. different curvature, different size (length, width and height) may be provided.

For example the FIG. 3a shows different known shapes rectangular, circular and quadrangular. The x-direction and the y-direction may be independently and continuously variable. The spot variation may be between 8 mm and 200 mm in both x-direction and y-direction. The variation in both x-direction and y-direction may be performed by a motor e.g. brushless DC-servo motor. The laser beam may comprise using a thermometer to measure high temperatures e.g. a pyrometer to estimate the temperature required soft-zones of the hot-stamped component, thus the temperature may be maintained within a desired range.

As a laser is moved along a component, and in between various portions of a component to be treated, the spot may be adjusted to have the shape and size required to form a soft zone.

The FIG. 3b shows a more complex shape that may be obtained in a single pass by combining the shapes of the FIG. 3a. I.e. in some examples, during the application of the laser beam, both the shape and size of the laser spot may be changed. By controlling the power of the laser in accordance with temperature measurements, a consistent heat treatment can be obtained in spite of large variations in the laser spot.

The inventors have found that a feed laser rate of advance between 5 mm/s and 100 mm/s and a laser beam with a power between 1 kW and 10 kW, optionally between 2.3 kW and 5.5 kW lead to particularly good results, while varying the spot of the laser beam in both x-direction and y-direction Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for manufacturing hot-stamped components comprising:
   providing a hot-stamped component by hot forming die quenching;
   selecting a first and a second portion of the hot-stamped component for which a microstructure is to be changed, wherein the first portion has a different width than the second portion;
   providing a laser system, wherein the laser system comprises one or more optical elements and a laser source for generating a laser beam;
   moving the laser system along a length of the component, while
   in a single pass applying a laser beam onto the first and second portions to change a microstructure of the first and second portions using the laser system, wherein a laser beam spot size is adjusted to a width of the first portion and a width of the second portion during the application of the laser beam, and wherein a power of the laser beam is regulated based on a temperature measured in the first and second portions, wherein the first portion is a soft zone for absorbing energy in a crash, and the second portion is a portion used in a post-operation.

2. The method according to claim 1, wherein the second portion is a flange or a riveting area.

3. The method according to claim 1, wherein selecting the first portion of the hot-stamped component comprises crash testing of the hot-stamped component.

4. The method according to claim 1, wherein selecting the first portion of the hot-stamped component comprises performing a simulation test of the hot-stamped component.

5. The method according to claim 1, wherein applying the laser beam comprises adjusting a width of the laser beam spot size between 8 mm and 180 mm and a height of the laser spot size between 8 mm and 180 mm.

6. The method according to claim 5, wherein applying the laser beam comprises adjusting the laser beam spot size using a continuous motor acting on the one or more optical elements.

7. The method according to claim 1, wherein applying the laser beam comprises using a laser beam power of between 1 kW and 10 kW.

8. The method according to claim 7, wherein the power of the laser beam is between 2.3 kW and 5.5 kW.

9. The method according to claim 1, wherein applying the laser beam comprises using a laser system with a rate of advance between 5 mm/s and 100 mm/s.

10. The method according to claim 1, wherein applying the laser beam comprises using an optical pyrometer to measure the temperature in the first and second portions.

11. The method according to claim 1, wherein modifying the microstructure of the first and second portions comprises maintaining a constant temperature along the first and second portions.

12. The method according to claim 1, wherein a shape of the laser beam spot size is substantially rectangular.

13. The method according to claim 1, wherein a shape of the laser beam spot size is substantially circular.

14. The method according to claim 1, wherein a strength of the first portion or the second portion is 600 MPa or less.

15. The method according to claim 14, wherein a maximum elongation of the first and second portions is 20%.

16. A method for manufacturing a B-pillar comprising:
   providing a hot-stamped B-pillar by hot forming die quenching;
   providing a laser system, wherein the laser system comprises one or more optical elements and a laser source for generating a laser beam;
   moving the laser system along a length of the B-pillar, while
   in a single pass applying a laser beam onto a first portion and a second portion of the B-pillar to change a local microstructure of the of the B-pillar using the laser system, wherein a laser beam spot size is adjusted during the application of the laser beam and is adapted to a width of the first portion and a width of the second portion, and wherein a power of the laser beam is regulated based on a temperature measured in the first and second portions, wherein
   the first portion is a soft zone for absorbing energy in a crash in a lower portion of the B-pillar, and the second portion is a portion of a flange of the B-pillar.

17. The method according to claim 16, wherein applying the laser beam comprises adjusting a width of the laser beam spot size between 8 mm and 180 mm and a height of the laser spot size between 8 mm and 180 mm.

18. The method according to claim 17, wherein applying the laser beam comprises adjusting the laser beam spot size using a continuous motor acting on the one or more optical elements.

19. The method according to claim 16, wherein a strength of the first portion or second portion is 600 MPa or less.

20. The method according to claim 16, wherein changing the local microstructure of the B-pillar comprises maintaining a constant temperature along the first and second portions.

* * * * *